H. C. CLAY.
STEERING GEAR.
APPLICATION FILED JUNE 20, 1908.

904,407.

Patented Nov. 17, 1908.

Witnesses
Frank A. Fahl
Thomas W. McMeans

Inventor
Harry C. Clay,
By Bradford Hood
Attorneys

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

STEERING-GEAR.

No. 904,407.  Specification of Letters Patent.  Patented Nov. 17, 1908.

Application filed June 20, 1908. Serial No. 439,527.

*To all whom it may concern:*

Be it known that I, HARRY C. CLAY, a citizen of the United States, residing at Columbus, in the county of Bartholomew and State of Indiana, have invented certain new and useful Improvements in Steering-Gear, of which the following is a specification.

It has heretofore been customary, in traction engines, to provide "rubbing blocks", which are mounted on the shell of the boiler, to prevent the steering wheels from being swung around too far. Such a construction, under some circumstances, results in a bad buckling of the boiler sheets and the object of my present invention is to provide a structure wherein the steering gear itself is provided with members adapted to engage the steering wheels when they are swung around far enough, and prevent their coming into engagement with the boiler shell.

The following drawings illustrate my invention.

Figure 1:
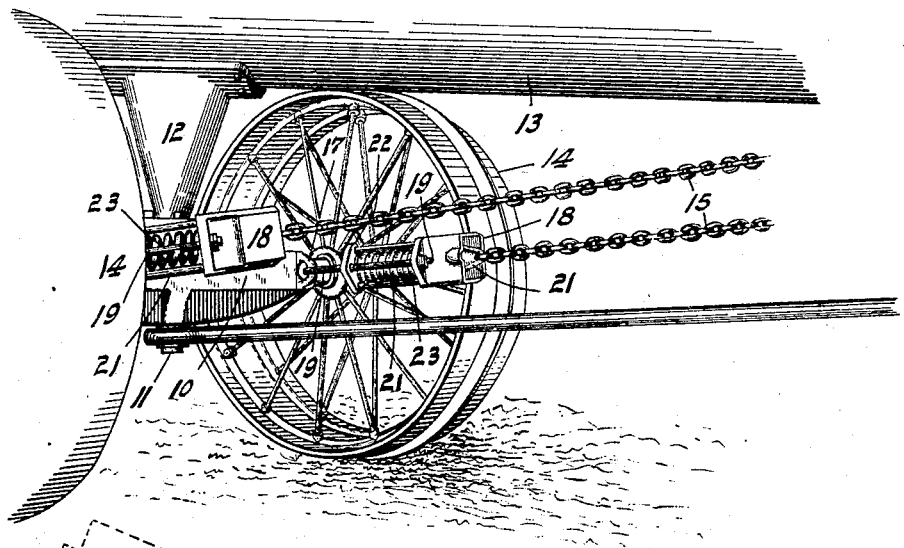
Figure 2:
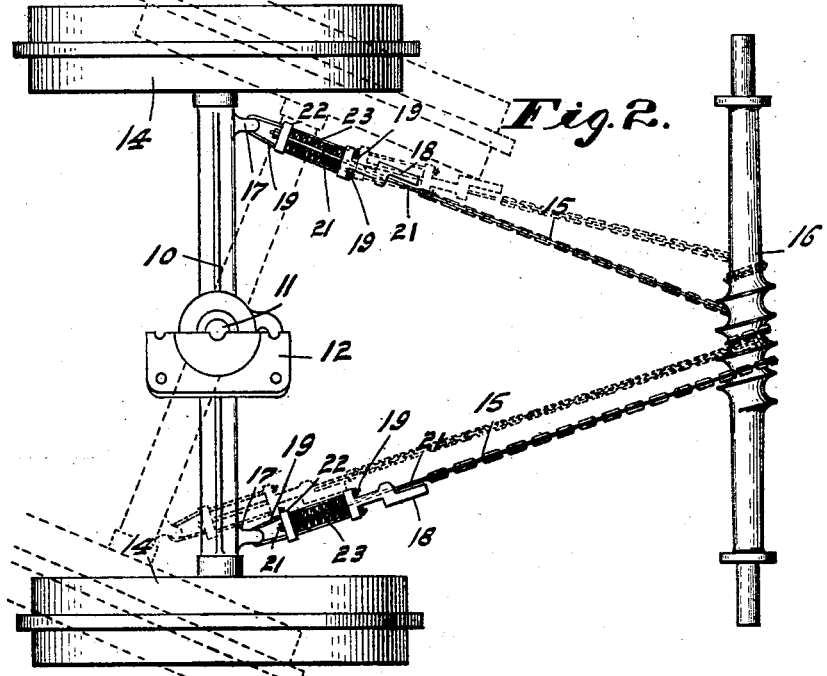

Figure 1 is a perspective view of the front wheel system of a traction engine, equipped with my improvement; Fig. 2 is a plan of the parts shown in Fig. 1 including also a conventionalized worm-shaft to which the steering chains are connected.

In the drawings, 10 indicates a front axle pivoted upon a vertical pivot 11 and supporting the pillow block 12 of the boiler 13. Journaled upon the opposite ends of axle 10 are the steering wheels 14, 14. The axle 10 is swung about its vertical pivot by means of chains 15, 15 which are passed around a suitable steering drum or shaft 16 and the forward ends of which are connected to eyes 17 carried by the axle 10. My improvement comprises the mounting, at the proper point upon the chains 15, of rubbing blocks 18, 18 each of which is adapted, when the axle 10 is swung toward it, to come into engagement with the rim of the adjacent wheel 14. In order to maintain the proper distance of the rubbing block 18 from the center of the wheel, said block is carried by a yoke 19 the forward end of which is connected by suitable nuts with the block 18 and the rear end of which engages eye 17, the yoke 19 being conveniently made by doubling a rod upon itself to form a U-shaped member. Passing through block 18 are the arms 21 of a U-shaped member connected to or forming a part of chain 15 and the forward ends of the arms 21 are connected to a sliding block 22, a compression spring 23 being placed between block 22 and the adjacent block 18, thus giving to the steering gear a requisite amount of yield in the steering chains.

In operation, when the axle is swung to the position indicated in dotted lines in Fig. 2, or to the opposite position, the rim of a wheel will be brought into engagement with the adjacent rubbing block 18 and prevented from passing any further under the boiler shell.

I claim as my invention:—

1. In a steering gear, the combination, with a swinging axle and traction wheels carried thereby, of steering chains attached to the axle at opposite sides of the axis, and a rubbing block carried by each of said chains in position to be engaged by the traction wheel when the axle is sufficiently swung.

2. In a steering gear, the combination, with a swinging axle and traction wheels carried thereby, of steering chains attached to the axle at opposite sides of the axis, a rubbing block carried by each of said chains in position to be engaged by the traction wheel when the axle is sufficiently swung, and a yieldable connection between the rubbing block and the steering chain carrying the same.

3. In an apparatus of the class described, the combination with a swinging axle and traction wheels carried thereby, of a rubbing block 18 pivotally connected to the axle, a sliding head 22 slidably connected with the rubbing block, a chain connected to said sliding head, and a spring arranged between the sliding head and the rubbing block.

In witness whereof, I, have hereunto set my hand and seal at Columbus, Indiana, this fifth day of June, A. D. one thousand nine hundred and eight.

HARRY C. CLAY. [L. S.]

Witnesses:
PERRY KING,
LA FAYETTE BRUCE.